(12) United States Patent
Poulsen et al.

(10) Patent No.: US 12,276,768 B2
(45) Date of Patent: Apr. 15, 2025

(54) SUSPENSION OF ELECTROMAGNETIC RECEIVER COIL

(71) Applicant: SELSKABET AF 6. APRIL 2010 APS, Aarhus N (DK)

(72) Inventors: Gregers Gjerlev Poulsen, Aarhus (DK); Sune Schøtt Mai, Aarhus N (DK); Kristoffer Skovgaard Mohr, Aarhus N (DK); Nicklas Skovgaard Nyboe, Aarhus N (DK)

(73) Assignee: SELSKABET AF 6. APRIL 2010 APS, Aarhus N (DK)

( * ) Notice: Subject to any disclaimer, the term of this patent is extended or adjusted under 35 U.S.C. 154(b) by 135 days.

(21) Appl. No.: 18/020,769

(22) PCT Filed: Aug. 11, 2021

(86) PCT No.: PCT/EP2021/072327
§ 371 (c)(1),
(2) Date: Feb. 10, 2023

(87) PCT Pub. No.: WO2022/034115
PCT Pub. Date: Feb. 17, 2022

(65) Prior Publication Data
US 2023/0305180 A1 Sep. 28, 2023

(30) Foreign Application Priority Data
Aug. 12, 2020 (DK) .............................. PA 202070525

(51) Int. Cl.
*G01V 3/17* (2006.01)
*F16M 11/12* (2006.01)
*F16M 11/22* (2006.01)

(52) U.S. Cl.
CPC ............... *G01V 3/17* (2013.01); *F16M 11/12* (2013.01); *F16M 11/22* (2013.01)

(58) Field of Classification Search
CPC . G01V 3/17; G01V 3/15; G01V 3/165; G01V 3/10; F16M 11/12; F16M 11/22
See application file for complete search history.

(56) References Cited

U.S. PATENT DOCUMENTS 2,740,962 A   4/1956  Hammond, Jr.
3,115,326 A   12/1963  Barringer
(Continued)

FOREIGN PATENT DOCUMENTS

DK    2524248 T3   11/2014
EP    3380873 A1   10/2018
(Continued)

*Primary Examiner* — Jermele M Hollington
*Assistant Examiner* — Zannatul Ferdous
(74) *Attorney, Agent, or Firm* — DINSMORE & SHOHL LLP (57) ABSTRACT

An electromagnetic receiver system with an EM receiver coil is for measuring EM signals while transported by a vehicle, e.g. a helicopter. A base part serves for connection to a towing system. A coil support is fixed to the electrical conductor of the EM receiver coil. A suspension system has gimbal axles defining gimbal axes arranged in one plane. The gimbal axles are arranged within a periphery of the EM receiver coil. A central element is connected to the gimbal axles, such that the axes intersect in an EM receiver coil central part. Joints allow the receiver coil to pivot around the first and second axes. Springs provide a self-righting effect on the coil around the axes. A precise calibration of centre of mass of the suspended receiver coil can be obtained by adding masses to cause the centre of mass to coincide with the geometric intersection between the axes.

17 Claims, 7 Drawing Sheets

(56) References Cited

U.S. PATENT DOCUMENTS

| | | | | |
|---|---|---|---|---|
| 3,538,428 A * | 11/1970 | Barringer | G01V 3/165 |
| | | | 324/330 |
| 3,617,866 A * | 11/1971 | Dowsett | G01V 3/165 |
| | | | 324/330 |
| 6,126,382 A * | 10/2000 | Scales | H01L 21/68 |
| | | | 414/757 |
| 7,982,662 B2 | 7/2011 | Shaffer | |
| 10,330,814 B2 | 6/2019 | Miles | |
| 10,393,910 B2 | 8/2019 | Miles | |
| 11,180,037 B2 * | 11/2021 | Lenius | B60L 53/12 |
| 2002/0030631 A1 | 3/2002 | Verkerk | |
| 2011/0001480 A1 | 1/2011 | Kuzmin et al. | |
| 2011/0016293 A1 | 1/2011 | Thonnart | |
| 2011/0248707 A1 * | 10/2011 | Shimizu | G01D 5/24495 |
| | | | 324/207.12 |
| 2016/0311196 A1 * | 10/2016 | D'Ottaviano | E04C 2/243 |
| 2018/0002036 A1 | 1/2018 | Tian et al. | |
| 2021/0332533 A1 * | 10/2021 | Zheng | E01B 29/16 |
| 2021/0356493 A1 * | 11/2021 | Mueggenborg | G01P 15/18 |

FOREIGN PATENT DOCUMENTS

| | | |
|---|---|---|
| GB | 638147 A | 5/1950 |
| JP | S5220865 B1 | 6/1977 |
| WO | 2017089184 A1 | 6/2017 |

* cited by examiner

SUSPENSION OF ELECTROMAGNETIC RECEIVER COIL

CROSS-REFERENCE TO RELATED APPLICATIONS

This application is the U.S. National Stage of PCT/EP2021/072327 filed on Aug. 11, 2021, which claims priority to Denmark Patent Application PA 202070525 filed on Aug. 12, 2020, the entire content of both are incorporated herein by reference in their entirety.

FIELD OF THE INVENTION

The present invention relates to the field of measuring electromagnetic signals, e.g. from the ground or the underground, such as for geophysical surveys. More specifically, to a suspension system for a mobile receiver coil for measurement of electromagnetic signals when towed by a vehicle, e.g. an airborne vehicle, such as a helicopter. Especially, the suspension system is designed for high quality electromagnetic measurements in response to transient electromagnetic (TEM) pulses with a low pulse rate.

BACKGROUND OF THE INVENTION

The invention relates to mobile or portable measuring equipment for mapping such as for geophysical surveys, especially equipment to be towed by a vehicle, e.g. a helicopter, for geology mapping. The equipment comprises at least an electromagnetic (EM) receiver system with a receiver coil arranged to receive an EM signal from the object to be surveyed. Especially, the measuring equipment may comprise a transmitter coil and an electric generator for generating an electrical pulse for providing a magnetic field build-up and decay (or current build-up and decay) in the formation, and where the EM receiver system measures the EM signal from the formation. Such method called Transient Electro-Magnetic (TEM) sounding, is known e.g. within the fields of mineral prospecting and mapping of ground-water resources. For some surveys a pulse rate of more than 30 Hz is preferred, while for other types of surveys, a low pulse rate is preferred, e.g. below 10 Hz, preferably down to such as 1-5 Hz.

To provide precise EM measurements, it is important that the receiver coil remains in a stable orientation throughout the time window where the EM signal is to be measured. This is a problem during towing of the receiver coil e.g. by a helicopter, since translations of the receiver coil are inevitable during towing, thus causing the receiver coil to change orientation in a random manner, thereby causing inaccurate measurements. Thus, there is a need for a receiver coil suspension system which reduces the effect of the inevitable translations during towing to cause unwanted orientation changes of the receiver coil. Especially, for TEM measurements with low pulse rates, e.g. below 10 Hz, it is a problem to provide a suspension that can ensure a stable receiver coil orientation and still be implemented with a light weight to allow airborne vehicle towing.

Since TEM measurements with low pulse rates below 10 Hz can provide valuable geological information, there is a need for a light weight mobile EM receiver coil system with a suspension system to ensure a stable receiver coil orientation for such low pulse rate TEM measurements.

SUMMARY OF THE INVENTION

In particular, it may be seen as an object of the present invention to provide an EM receiver system which can provide TEM measurements with a high quality at TEM pulse rates below 10 Hz. Further, the EM receiver system should preferably be possible to implement in compact and with light weight versions to allow airborne vehicle towing. Further, the EM receiver system should preferably be robust enough for practical handling for field measurements lasting days or weeks without the need for any laboratory calibration.

In a first aspect, the invention provides an EM receiver system for measuring EM signals while being transported by an associated vehicle, comprising
- a base part arranged for connection to the associated vehicle,
- a EM receiver coil comprising a plurality of windings of an electrical conductor and being arranged for measuring an EM signal, further comprising a coil support fixed to the electrical conductor,
- a suspension system comprising
- first and second gimbal axles defining first and second gimbal axes, e.g. perpendicular first and second gimbal axes, arranged in one plane, wherein the first and second gimbal axles are arranged within a periphery defined by the EM receiver coil,
- a central element arranged in a central part of the EM receiver coil and connected to both of the first and second gimbal axles, so that the first and second gimbal axes intersect in a central part of the EM receiver coil,
- a first set of joints fixed to the coil support and a second set of joints fixed to the base part, so as to allow the EM receiver coil to pivot around the first and second gimbal axes, and
- a spring system serving to provide a self-righting effect on the EM receiver coil around each of the first and second gimbal axes.

This EM receiver coil system is advantageous, since such system can be implemented in a compact and light weight version and still provide a suspension with a very low natural oscillation frequency, such as 1 Hz or even below 1 Hz. Due to the defined gimbal axle structure, it is possible to ensure that the centre of mass of the suspended receiver coil can be precisely calibrated to coincide with the intersection point of the gimbal axes. The inventors have appreciated that this provides a suspension system which gives a minimal transfer of translation movements into orientation changes of the receiver coil, thus providing a high degree of attenuation of receiver coil movements with a negative influence on EM measurement accuracy.

Further, the suspension system allows precise adjustments of this centre of mass by adding masses in a laboratory setting. Such masses can be securely fixed to the coil support, thereby providing a robust calibration of the suspension system which can withstand even tough handling during weeks of field surveys without the need for calibration.

In preferred embodiments, all components of the coil support and the suspension system are made of components with a high stiffness, which further improves the performance of the suspension as well as its long term stability with respect to the calibration of the centre of mass. Most preferably, the mentioned components are formed by materials having none or insignificant magnetic and electromagnetic influence, thus providing insignificant influence on the EM measurements.

Preferably, the first and second gimbal axes are perpendicular axes, i.e. preferably the gimbal axes are arranged at an angle of 88°-92°. However, the first and second gimbal axes may be arranged at an angle outside this interval, if preferred.

The EM receiver coil system is suited for high quality TEM based measurements at low pulse rates, such as pulse rates at standard rates of 25.0 Hz, 12.5 Hz, 6.25 Hz, 3.125 Hz, and even 1.5625 Hz.

In the following, preferred features and embodiments will be described.

In a preferred embodiment, at least one part, such as the coil support, is arranged to receive a mass, so as to allow adjustment of a centre of mass of the EM receiver coil to coincide with a point of intersection of the first and second gimbal axles. Hereby, a robust way of calibrating the suspension system is provided which allows a high performance of the EM receiver system to be maintained even under tough conditions, e.g. various temperatures and humidity, during field surveys with a duration of several days or weeks without the need for calibration of the centre of mass. The centre of mass can be calibrated in this way with an accuracy of such as +/−0.1 mm, and such accuracy can be maintained over a long period of time during use of the EM receiver system.

In preferred embodiments, the central element comprises a sandwich element formed by a fibre reinforced polymer and a foam, wherein the sandwich element serves to fix relative positions of the first and second gimbal axes. Such structure is both light weight and provides a high stiffness, thus ensuring a precise fixation of the gimbal axles.

Each of the first and second gimbal axles may be formed by respective aluminium oxide pipes. Especially, the aluminium oxide ($Al_2O_3$) pipes may be such as coated by a carbon fibre reinforced polymer coating. Such pipes have been found to provide a high stiffness which is important for precise control of the centre of mass of the receiver coil.

The coil support may be formed by a foam structure surrounding the electrically conducting windings forming the EM receiver coil. Especially, the foam structure may be coated with a carbon fibre reinforced coating. Specifically, such as the carbon fibre coating may serve as an electric shielding element. Further, the coil support may be provided with fixation structures at a plurality of locations on its surface, so as to allow fixation of mass elements at various locations for spatial calibration of the centre of mass of the EM receiver coil.

The spring system may be adjusted so as to provide a natural oscillation frequency for the EM receiver coil around each of the first and second gimbal axes which is within 0.1-10.0 Hz. Preferably within 0.2-5.0 Hz, such as 0.2-3.0 Hz, such as 0.5-2.0 Hz, such as within 0.7-1.3 Hz. Especially, it has been found that reliable high quality TEM measurements can be performed with a pulse rate of below 10 Hz, such as a pulse rate of 6.25 Hz or 3.125 Hz, when the spring system is adjusted to provide a natural oscillation frequency around 1.0 Hz, in some implementations around 0.5 Hz.

The spring system may comprise a set of springs, such as formed by a fibre glass, on each of the first and second gimbal axles. Especially, the spring system may comprise one spring located near each end of each of the first and second gimbal axles.

Each joint of the first and second sets of joints preferably comprises a ball bearing, such as a non-magnetic and non-conducting ball bearing, e.g. a ceramic ball bearing. Ball bearings have been found to provide a high precision and a reliable solution ensuring high precision over time during practical use.

In preferred embodiments, the plurality of windings of electrical conductor of the EM receiver coil form a ring with a circular shape. A stiff coil and coil support can be provided with a circular shape which is import for a high measurement precision at both high and low frequencies. Especially, said ring has a height within a factor of 0.05 to 0.5 of a diameter of said ring. Thus, specifically the coil may be wound as a circular spiral to provide a cylindrical structure. The electrical conductor may be embedded in or constitute part of the material forming the coil support.

In another embodiment, a third gimbal axle defining a third gimbal axis is arranged in relation to the first and second gimbal axles, such as perpendicular to the first and second gimbal axles, wherein the third gimbal axle is arranged in a central part of the EM receiver coil. With such third gimbal axle, additional advantages with respect to reduction of noise inducing movements of the EM receiver coil can be obtained, especially at very low frequencies. Preferably, such third gimbal axle is fixed to the base part, and where at least one spring serves to provide a self-righting effect on the EM receiver coil around the third gimbal axis.

In a second aspect, the invention provides an EM signal measurement system comprising an EM receiver system according to the first aspect, and a towing system arranged for connection to the base part of the EM receiver system, so as to allow the EM receiver system to be towed by a moving vehicle. Especially the vehicle may be an airborne vehicle, e.g. a helicopter or an UAV, or the vehicle may be a land-based, e.g. a car or truck, or a seaborne vehicle, such as a ship.

In some embodiments, the system comprises an EM signal recording system connected to the EM receiver coil so as to receive an electric signal indicative of an EM signal received by the coil and to store a time series of data accordingly. In some implementations, the data are stored on a physical medium or in a memory, or data may be transferred wirelessly to a cloud based storage.

To allow TEM based measurements, the EM signal measurement system may comprise an EM transmitter coil arranged for generating EM pulses, wherein the towing system is arranged for carrying the EM transmitter coil, and an electric generator system arranged for connection to the EM transmitter coil, wherein the electric generator system is arranged to generate electric pulses with at least one pulse rate within 0.1-60 Hz, such as within at least 1-25 Hz. Especially, the electric generator may be arranged to generate electric pulses with a plurality of specific shapes and/or pulse rates, such as with a pulse rate of one or more of: 25.0 Hz, 12.5 Hz, 6.25 Hz, 3.125 Hz, and 1.5625 Hz.

In a third aspect, the invention provides a method for measuring EM signals, the method comprising
 providing an EM receiver system according to the first aspect,
 connecting the base part of the EM receiver system to a mobile vehicle,
 towing the EM receiver system by means of the mobile vehicle, and
 recording EM signals received by the EM receiver coil during towing.

In a fourth aspect, the invention provides use of the EM receiver system according to the first aspect for TEM based measurements with a pulse rate of below 30 Hz, such as below 10 Hz.

In a fifth aspect, the invention provides measured EM signal data which have been measured by means of the EM receiver system according to the first aspect.

In a sixth aspect, the invention provides measured EM signal data which have been measured by means of the EM signal measurement system according to the second aspect.

The individual aspects of the present invention may each be combined with any of the other aspects. These and other aspects of the invention will be apparent from the following description with reference to the described embodiments.

BRIEF DESCRIPTION OF THE DRAWINGS

The invention will now be described in more detail with regard to the accompanying figures. The figures show one way of implementing the present invention and is not to be construed as being limiting to other possible embodiments falling within the scope of the attached claim set.

DETAILED DESCRIPTION OF THE INVENTION

Figure 1:
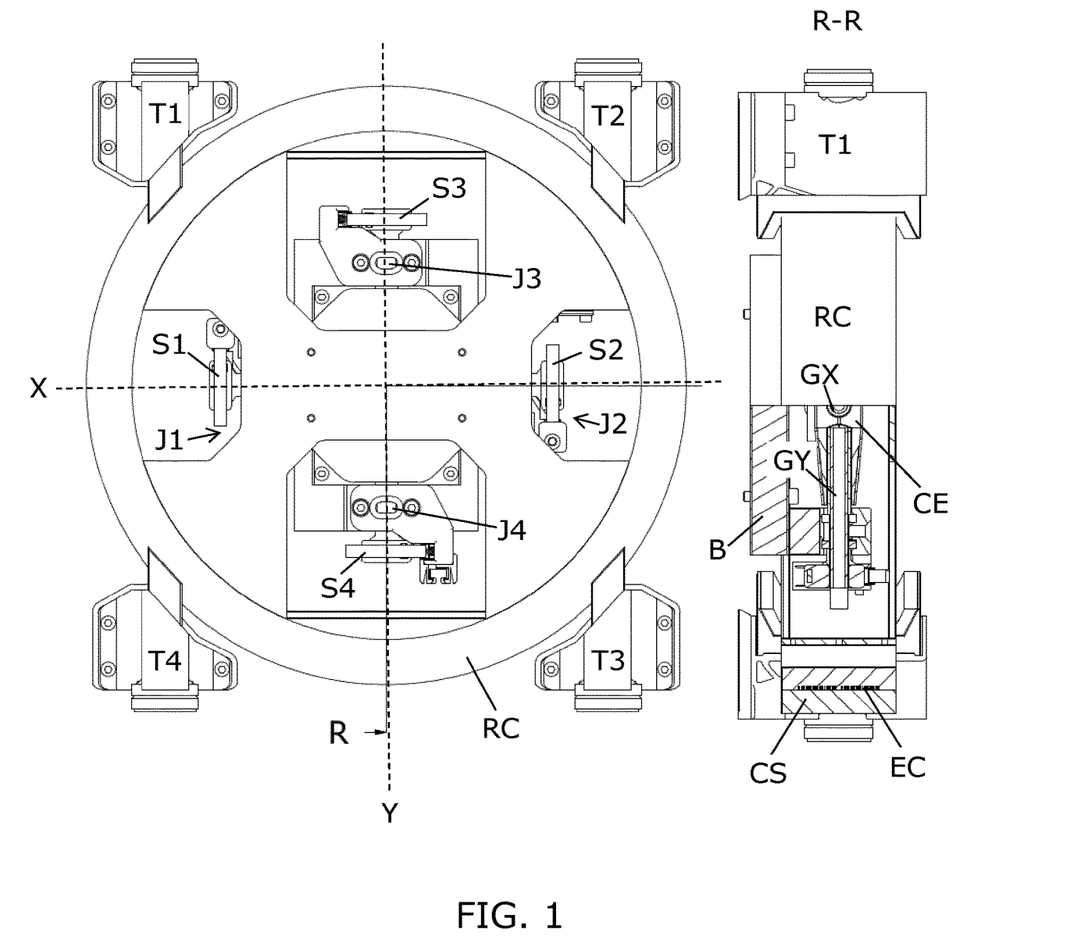
FIG. 1 illustrates an upper view and a section view of an EM receiver system embodiment.
Figure 2A:
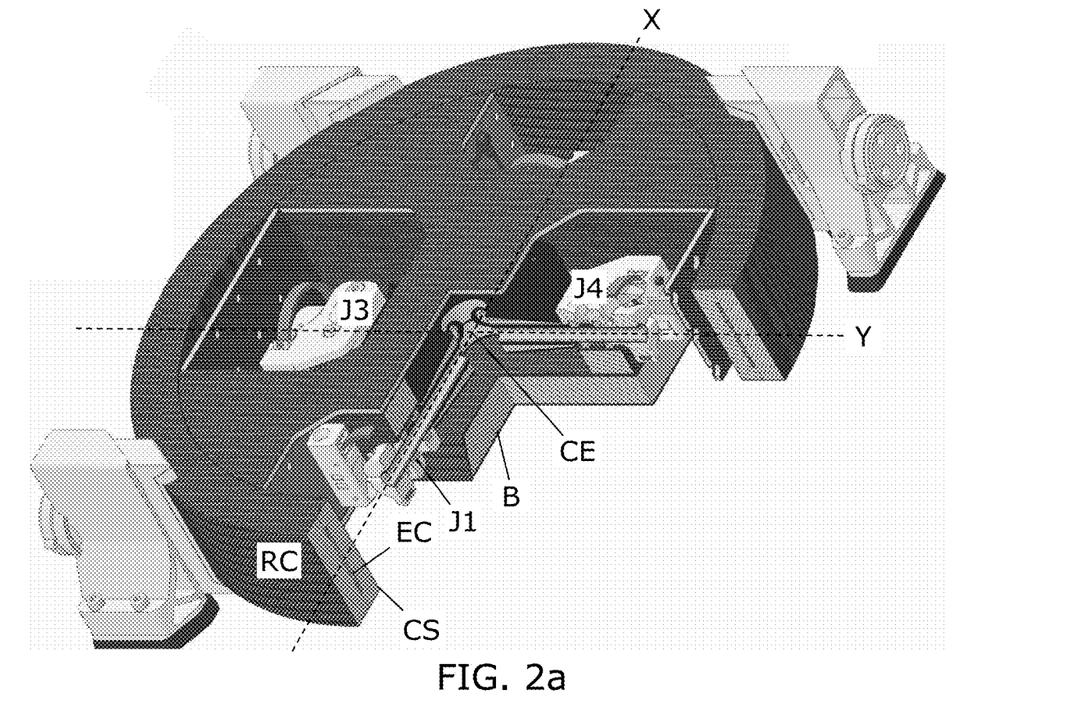
FIGS. 2a and 2b illustrate 3D partial cut views of the embodiment of FIG. 1.
Figure 2B:
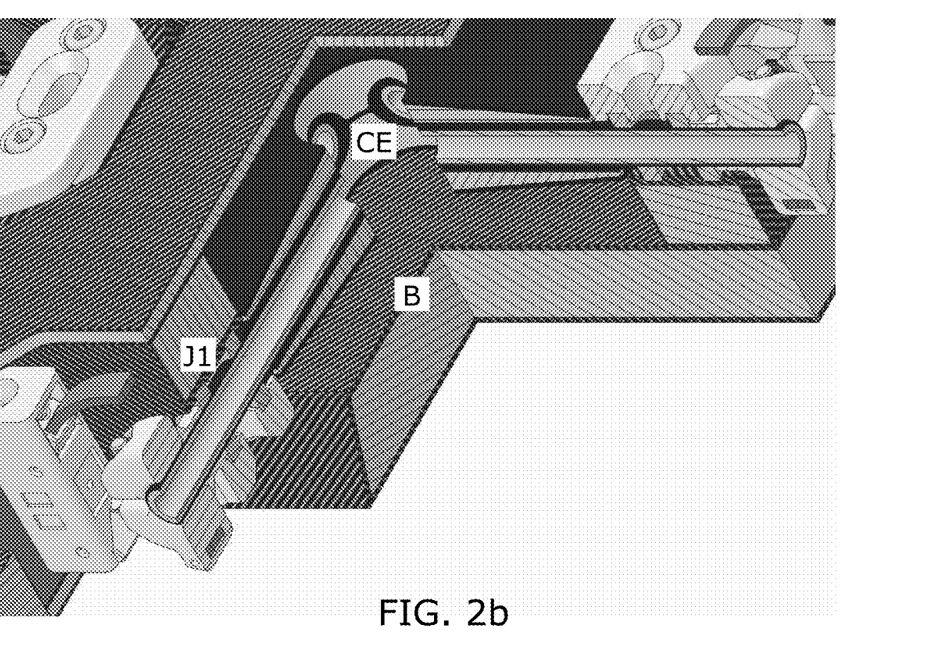
Figure 3:
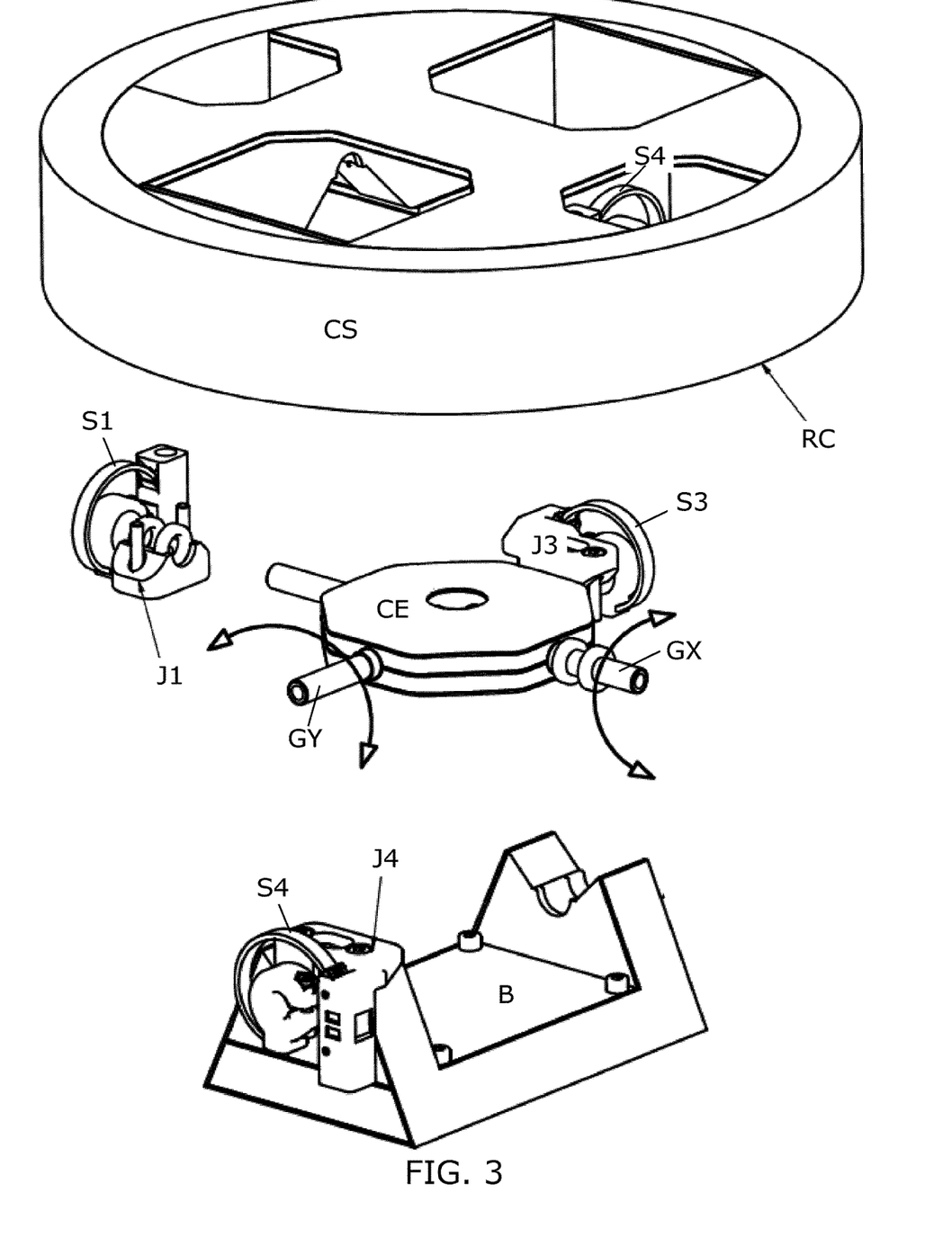
FIGS. 3 and 4 illustrate different exploded views of the elements of the embodiment of FIG. 1.
Figure 4:
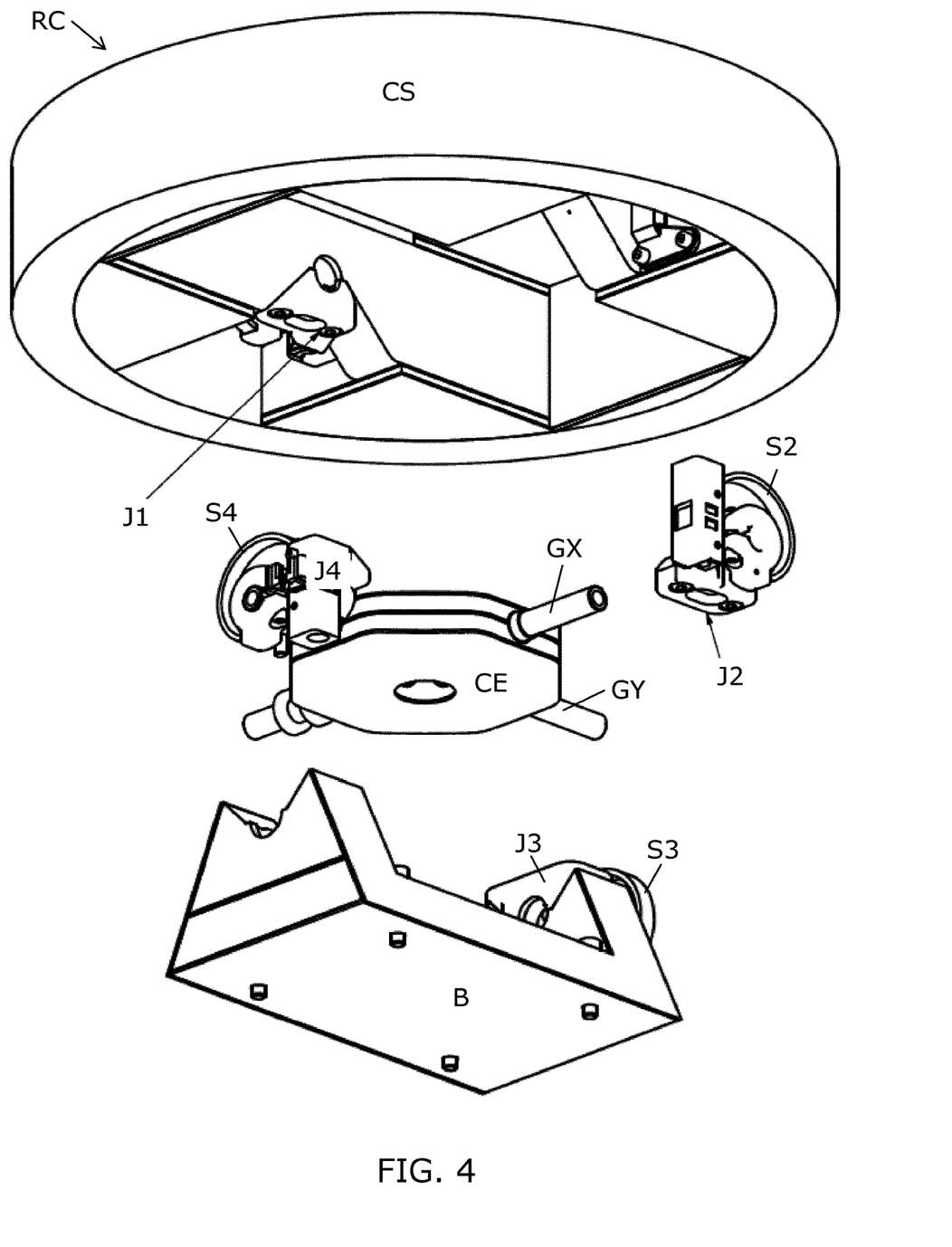

In the following, FIGS. 1-4 serve to illustrate one specific embodiment which has been tested and found capable of providing high quality EM signal data when towed by a helicopter down to a very low frequency limit when the suspension system is adjusted to provide a natural oscillation frequency around 1.0 Hz or even as low as around 0.5 Hz. FIG. 1 illustrates a top view and a section view of an assembled EM receiver system embodiment, while FIGS. 2a and 2b illustrate 3D views, and FIGS. 3 and 4 show exploded views of the same embodiment as shown in FIG. 1.

Referring now to FIGS. 1-4, a base part B in the form of a plane element is arranged for connection to the associated vehicle. A circular shaped EM receiver coil RC is formed by a plurality of windings of an electrical conductor EC. The electrical conductor EC, e.g. aluminium or copper, is arranged inside a coil support CS which has on its inside a foam material which serves to fix the position of the electrical conductor EC. The electrical conductor EC is preferably wound in a spiral shape so as to form a cylindrical coil having a height in a direction perpendicular to the X and Y axes, and which in the X-Y plane forms a circular shape. Especially, the electrical conductor EC is positioned in pre-cut tracks in Styrene AcryloNitrile (SAN) foam.

The suspension system has first and second gimbal axles GX, GY defining perpendicular first and second gimbal axes X, Y. The gimbal axles GX, GY are arranged in one plane, and they are positioned within a periphery defined by the EM receiver coil RC. A central element CE is arranged in a central part of the EM receiver coil RC and fixed to both of the first and second gimbal axles GX, GY in a manner so that the first and second gimbal axes X, Y intersect in a central part of the EM receiver coil RC, e.g. in a geometrical centre point of the EM receiver coil RC, but not necessarily exactly here. A first set of joints J1, J2 are fixed to the coil support CS and a second set of joints J3, J4 are fixed to the base part B. The coil support CS, i.e. the ring shaped structure supporting the electrically conducting wire and which has a stiff connection to a central structure part, and this central structure part of the coil support CS is connected to the joints J1, J2.

The first set of joints serve to support respective ends of the first gimbal axle GX, while the second set of joints J3, J4 serve to support the second gimbal axle GY, so as to allow the EM receiver coil RC to pivot around the first and second gimbal axes X, Y. A spring system with a set of four adjustable spiral torsion springs S1, S2, S3, S4 are mounted near the ends of the gimbal axles GX, GY, and serve to provide a self-righting effect on the EM receiver coil RC around both the first and second gimbal axes X, Y.

The shown embodiment has been tested with the springs S1, S2, S3, S4 adjusted to provide a natural oscillation frequency of such as 1.0 Hz or 0.5 Hz around both gimbal axes X, Y. For optimal performance, masses can be added to be fixed to the EM receiver coil support CS according to a calibration procedure in order to adjust the centre of mass of the EM receiver coil RC to coincide with the gimbal axes X, Y intersection point. Hereby, the EM receiver coil RC will move in a manner which has a minimal influence of the measured EM signals, even down to a very low frequency. Especially, it has been found that high quality TEM data can be obtained down to low pulse rates, especially 6.25 Hz and even 3.125 Hz.

In the shown embodiment, the springs S1, S2, S3, S4 are fiber glass spiral torsion springs, e.g. formed as 3D printed elements. Each of the springs S1, S2, S3, S4 have an end connected to a housing which houses the bearing of the respective joints J1, J2, J3, J4. Each of these ends of the springs S1, S2, S3, S4 are provided with an adjustment screw mechanism to allow adjustment of the springs function. E.g. this adjustment function may be used to adjust the general tilting of the EM receiver coil RC in relation to the towing structure to which it is mounted for use, thereby allowing a precise orientation of the EM receiver coil RC. Such precision may be useful e.g. in relation to ensuring a parallel orientation of the coil plane with respect to a magnetic field component that one would like to suppress in the recorded signal. For further reference to this issue, see e.g. U.S. Pat. No. 7,053,622 B2.

For calibration, the coil support CS has on its four extremities holes for receiving mass elements that can be added to move the centre of mass of the EM receiver coil EC so that it coincides or overlaps with the geometric centre of the gimbal axes X, Y. Preferably, for use, the centre of mass is calibrated in this way to a precision of 0.1 mm for all three dimensions, so as to ensure that translation movement will couple only in a minimum possible way to a harmful rotation of the EM receiver coil RC.

In preferred embodiments, each of the joints J1, J2, J3, J4 comprise two bearings formed by aluminium oxide ($Al_2O_3$), the bearings are mounted in tracks formed in the carbon fiber structure. Preferably, the bearings are ball bearings with bearing balls formed by a ceramic material.

Preferably, a preamplifier (not visible) electrically connected to the EM receiver coil RC is mounted within the EM receiver coil RC, so as to provide short electric wires between the EM receiver coil and the preamplifier connected to the EM receiver coil RC.

The base part B is preferably formed by a fibre reinforced polymer and a foam sandwich structure. This provides a stiff base for attachment to a towing system. If preferred, a vibration isolation platform may be inserted between the base part B and the towing system.

The coil support CS and its central structure part forms a stiff, rigid element, and the part surrounding the electrical conductor of the receiver coil RC is preferably formed by a SAN foam. Most preferably, the carbon fiber is in the form of a laminated carbon fiber and glass fiber structure. The carbon fiber provides stiffness and can at the same time provide an electric shielding effect, e.g. by the carbon fiber being electrically connected to electric ground on the pre-amplifier.

Four transport protecting mechanisms T1, T2, T3, T4 are provided to engage with the EM receiver coil RC to stop movements of the EM receiver coil RC during transportation, i.e. when the EM receiver coil RC is not in use. These protecting mechanisms T1, T2, T3, T4 may especially have sliding mechanisms that serve to fix the position of the EM receiver coil RC while in one position, while in another position allowing the EM receiver coil RC to freely move around the gimbal axes X, Y in normal use for EM signal recording.

The base part B is preferably formed by a SAN foam and carbon fibre sandwich to form a stiff structure.

Preferably, the centre element CE is formed by a SAN foam and carbon fiber structure cast around four pipes which, pairwise, form the two gimbal axles GX, GY.

Figure 5:
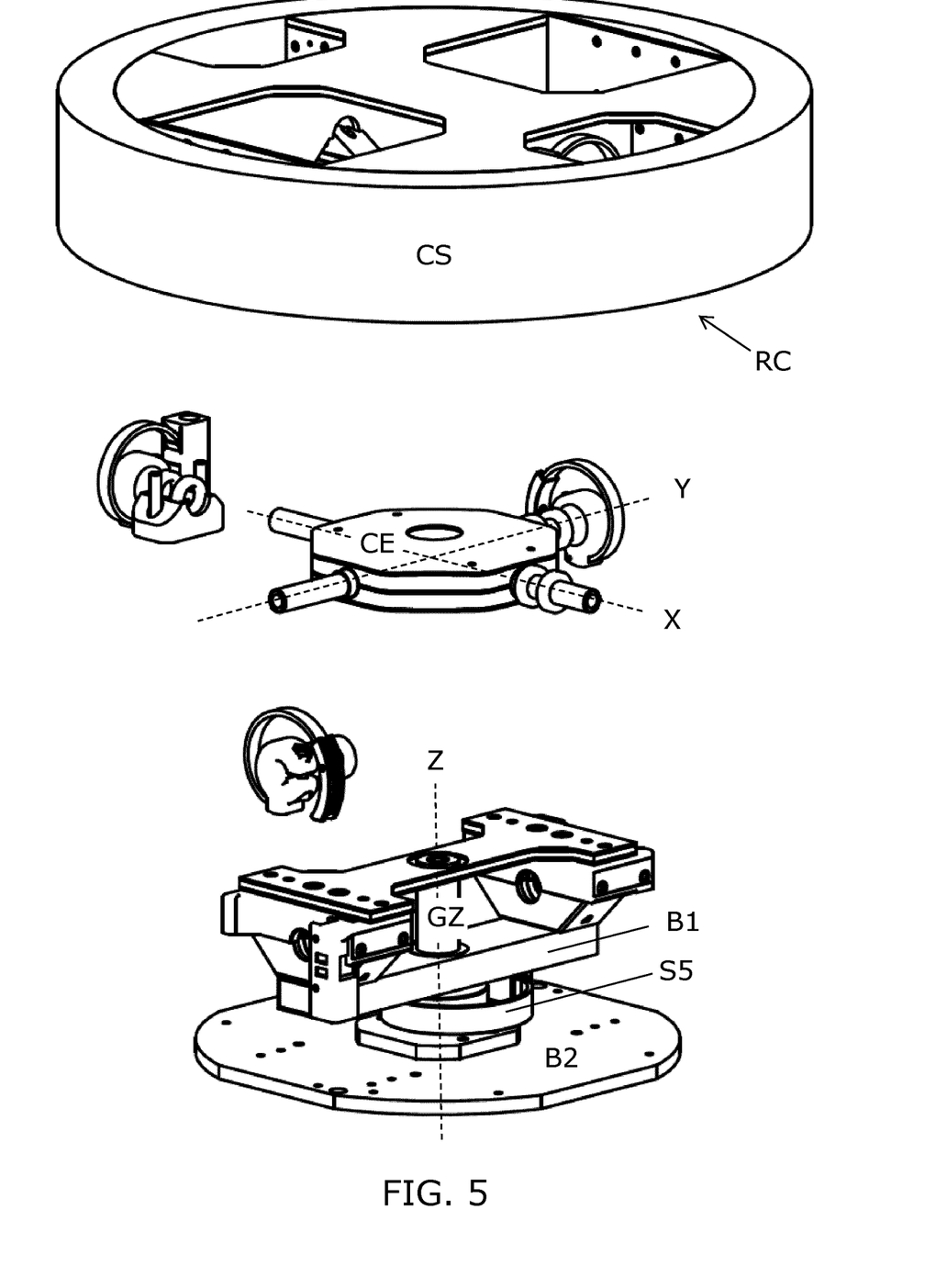
FIG. 5 illustrates an exploded view of another embodiment with three gimbal axes.

FIG. 5 illustrates an embodiment with three gimbal axles GX, GY, GZ. Compared to the two axle embodiments described above, a third gimbal axle GZ is arranged perpendicular to the first and second gimbal axles GX, GY, thus defining a third axis Z. The third gimbal axle GZ is arranged in a central part of the EM receiver coil RC. In this embodiment, a cross beam B1 is mounted on a bearing to allow the cross beam B1 and thus the second gimbal axle GY to rotate around the third gimbal axle GZ.

The third gimbal axle GZ is seen to be fixed in one end to the base part B2, and in the opposite end it is connected to a top element with a bearing to allow rotation. The third gimbal axle GZ is arranged in a hole through a central part of the central element CE. A spring S5 is arranged around the third gimbal axle GZ and being fixed to the base part B2, and this spring S5 serves to provide a self-righting effect on the EM receiver coil RC around the third gimbal axis Z. The spring S5 may be designed to provide a natural oscillation frequency 0.5 Hz or even lower for the rotation around the third gimbal axis Z. Elements B1, B2 and the top element together can be seen as constituting an equivalence to the base part B as described for the in the previous two-axle version.

It is to be understood that the function of such third gimbal axle GZ may be implemented in other ways than described above, based on the principles described for the version with two gimbal axles GX, GY.

Figure 6:
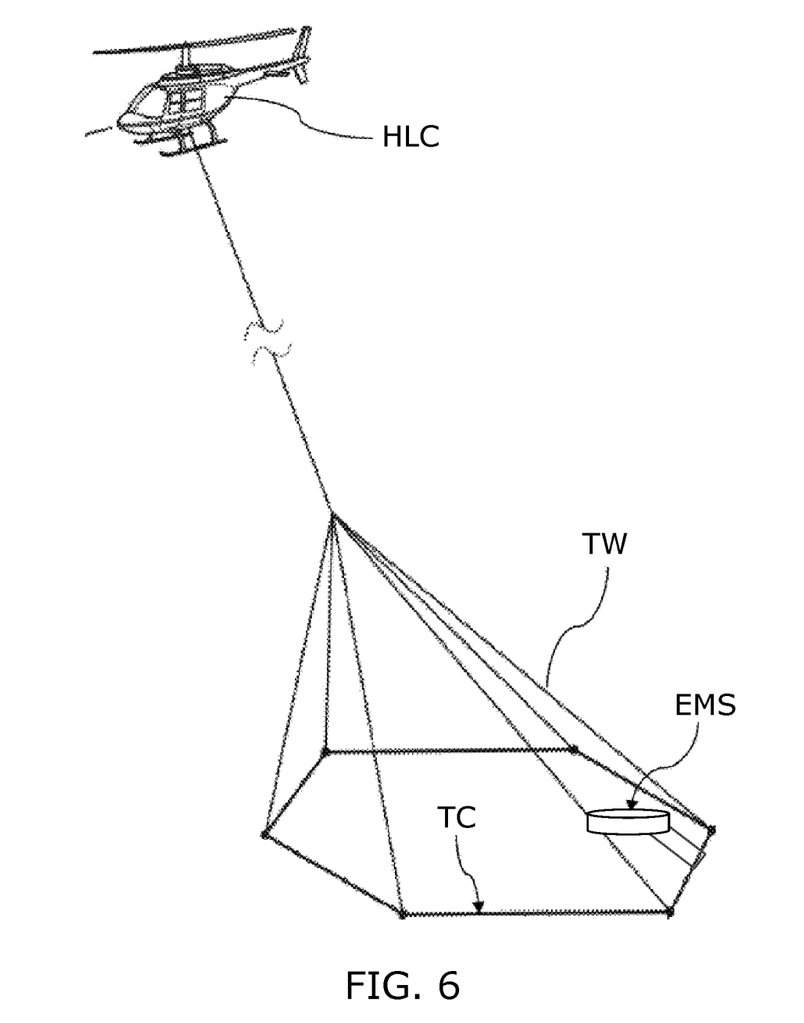
FIG. 6 illustrates an EM measurement system embodiment for TEM measurements being towed by a helicopter.

FIG. 6 illustrates a complete TEM measurement system for geological surveys, e.g. for providing measurement data to be analyzed, e.g. for locating ground-water resources. A helicopter HLC is connected via a towing system TW to a TEM transmitter coil TC with an electrically conducting transmitter coil attached to or located within a structure to be towed parallel with the ground. In the shown embodiment, the EM receiver system EMS is structurally connected with its base part fixed to the structure of the transmitter coil TC such that the EM receiver coil is also towed parallel with the ground. However, it is to be understood that a non-rigid connection of the EM receiver system EMS and the transmitter coil TC can also be used. As illustrated, the size of the transmitter coil TC is significantly larger than the size of the EM receiver system EMS, which is typically the case.

Figure 7:
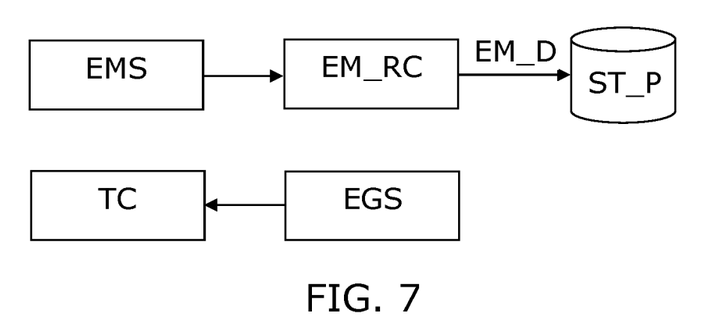
FIG. 7 illustrates a block diagram of components of an EM measurement system embodiment.

FIG. 7 illustrates a block diagram of elements of a TEM measurement system. A transmitter coil TC serves to provide EM pulses by means of an electric current which is generated by an electric generator system EGS, e.g. arranged to generate electric pulses with a fixed repetition rate of such as 0.1-60 Hz, e.g. a selectable fixed repetition rate within 0.1-60 Hz. An EM receiver system EMS with a suspension system as described in the foregoing is arranged to receive EM signal responses from the surveyed object in response to the applied EM signal pulses provided by the transmitter coil TC. The receiver coil of the EM receiver system EMS is electrically connected via a pre-amplifier, e.g. a differential amplifier, to an EM recording system EM_RC including an analog-to-digital converter and e.g. other analog or digital signal pre-processing means. The resulting EM signal data EM_D are then stored on a storage platform ST_P in a predefined data format for later analysis. The storage platform ST_P may be in the form of a physical storage medium, e.g. a hard disk or the like, a computer memory, or a cloud based storage.

Figure 8:
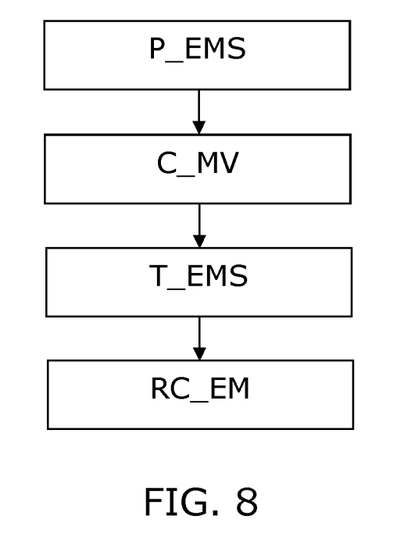
FIG. 8 illustrated steps of a method embodiment.

FIG. 8 illustrates steps of an embodiment of a method for measuring EM signals. First step is providing P_EMS an EM receiver system as described in the foregoing. Next, connecting C_MV the base part of the EM receiver system to a mobile vehicle, e.g. a helicopter. Next, towing T_EMS the EM receiver system by means of the mobile vehicle, and recording RC_EM EM signals received by the EM receiver coil during towing, e.g. to enable geological mapping of an area using the recorded EM signals.

To sum up, the invention provides an electromagnetic (EM) receiver system with an EM receiver coil for measuring EM signals while being transported by a vehicle (HLC), e.g. a helicopter. A base part (B) serves for connection to a towing system of the vehicle. A coil support (CS) is fixed to the electrical conductor (EC) of the EM receiver coil. A suspension system has gimbal axles (GX, GY) defining gimbal axes (X, Y) arranged in one plane. The gimbal axles (GX, GY) are arranged within a periphery of the EM receiver coil (RC). A central element (CE) is connected to the gimbal axles (GX, GY), as positioned so that the gimbal axes (X, Y) intersect in a central part of the EM receiver coil (RC). Joints (J1, J2, J3, J4) are arranged so as to allow the EM receiver coil (RC) to pivot around the first and second gimbal axes (X, Y). Springs (S1, S2, S3, S4) provide a self-righting effect on the EM receiver coil (RC) around the gimbal axes (X, Y). A precise calibration of centre of mass of the suspended EM receiver coil can be obtained by adding masses to cause the centre of mass to coincide with the geometric intersection between the gimbal axes. In this way, a high suppression of rotations of the EM receiver coil during EM signal recording can be obtained, thereby improving data quality. E.g. this allows recording of high quality EM signals, e.g. for TEM based measurements with a helicopter towed EM measurement system at low TEM pulse rates, e.g. below 10 Hz.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features may be possible and advantageous.

The invention claimed is:

1. An EM receiver system for measuring EM signals while being transported by an associated vehicle, comprising
a base part arranged for connection to the associated vehicle,
a EM receiver coil comprising a plurality of windings of an electrical conductor and being arranged for measuring an EM signal, further comprising a coil support fixed to the electrical conductor,
a suspension system comprising
first and second gimbal axles defining first and second gimbal axes arranged in one plane,
wherein the first and second gimbal axles are arranged within a periphery defined by the EM receiver coil,
a central element arranged in a central part of the EM receiver coil and connected to both of the first and second gimbal axles, so that the first and second gimbal axes intersect in a central part of the EM receiver coil,
a first set of joints fixed to the coil support and a second set of joints fixed to the base part, so as to allow the EM receiver coil to pivot around the first and second gimbal axes, and
a spring system serving to provide a self-righting effect on the EM receiver coil around each of the first and second gimbal axes.

2. The EM receiver system according to claim 1, comprising at least one part, such as the coil support, arranged to receive a mass, so as to allow adjustment of a centre of mass of the EM receiver coil to coincide with a point of intersection of the first and second gimbal axles.

3. The EM receiver system according to claim 1, wherein the central element comprises a sandwich element formed by a fibre reinforced polymer and a foam, wherein the sandwich element serves to fix relative positions of the first and second gimbal axes.

4. The EM receiver system according to claim 1, wherein each of the first and second gimbal axles are formed by respective aluminium oxide pipes.

5. The EM receiver system according to claim 1, wherein the coil support is formed by a foam structure surrounding the electrically conducting windings forming the EM receiver coil.

6. The EM receiver system according to claim 1, wherein the base part is formed by a structure being a fibre reinforced polymer and a foam sandwich structure.

7. The EM receiver system according to claim 1, wherein the spring system is adjusted so as to provide a natural oscillation frequency for the EM receiver coil around each of the first and second gimbal axes which is within 0.1-10.0 Hz.

8. The EM receiver system according to claim 1, wherein the spring system comprises a set of springs on each of the first and second gimbal axles.

9. The EM receiver system according to claim 1, wherein each joint of the first and second sets of joints comprises ball bearings.

10. The EM receiver system according to claim 1, wherein the plurality of windings of electrical conductor of the EM receiver coil form a ring with a circular shape.

11. The EM receiver system according to claim 10, wherein said ring has a height within a factor of 0.05 to 0.5 of a diameter of said ring.

12. The EM receiver system according to claim 1, further comprising a third gimbal axle defining a third gimbal axis arranged in relation to the first and second gimbal axles, wherein the third gimbal axle is arranged in a central part of the EM receiver coil.

13. The EM receiver system according to claim 12, comprising at least one spring serving to provide a self-righting effect on the EM receiver coil around the third gimbal axis.

14. An EM signal measurement system comprising
an EM receiver system according to claim 1, and
a towing system arranged for connection to the base part of the EM receiver system, so as to allow the EM receiver system to be towed by a moving vehicle.

15. The EM signal measurement system according to claim 14, further comprising:
an EM signal recording system connected to the EM receiver coil so as to receive an electric signal indicative of an EM signal received by the coil and to store a time series of data accordingly.

16. The EM signal measurement system according to claim 14, further comprising:
an EM transmitter coil arranged for generating EM pulses, wherein the towing system is arranged for carrying the EM transmitter coil, and
an electric generator system arranged for connection to the EM transmitter coil, wherein
the electric generator system is arranged to generate electric pulses with at least one pulse rate within 0.1-60 Hz.

17. A method for measuring EM signals, the method comprising:
providing (P_EMS) an EM receiver system according to claim 1,
connecting (C_MV) the base part of the EM receiver system to a mobile vehicle,
towing (T_EMS) the EM receiver system by means of the mobile vehicle, and
recording (RC_EM) EM signals received by the EM receiver coil during towing.

* * * * *